April 19, 1955 — T. P. PETERSON — 2,706,361
PIVOTED PLATFORM TRAP
Filed Sept. 1, 1953

Inventor
Theodore P. Peterson
By Wilfred E. Lawson
ATTY

United States Patent Office 2,706,361
Patented Apr. 19, 1955

2,706,361

PIVOTED PLATFORM TRAP

Theodore P. Peterson, Mitchell, S. Dak.

Application September 1, 1953, Serial No. 377,804

4 Claims. (Cl. 43—69)

This invention relates generally to traps and is directed particularly to improvements in traps designed for catching small animals such as mice and rats, which are automatically reset after each catch.

A particular object of the present invention is to provide a pivoted platform trap which is designed to automatically reset itself after each catch and wherein novel means is provided for releasably holding the pivoted platform in set position until the animal has advanced onto the platform a predetermined distance beyond the pivot line whereby to prevent the animal escaping when the platform begins to move or swing downwardly.

A further object of the invention is to provide a trap of the above described character, wherein a pair of platforms are provided above a receptacle, with the downwardly swinging ends of the platforms disposed in spaced opposed relation at approximately the transverse center of the receptacle and with magnetic means for attracting the said adjacent ends of the platforms and releasably holding them in a common plane.

Still another object of the invention is to provide, in a manner as hereinafter set forth, a trap structure of the above described character wherein the magnetic holding means is arranged to cooperate with the platforms in a novel manner whereby there is obtained a relatively simple construction with efficient action.

Still another object of the invention is to provide, in a manner as hereinafter set forth, a pivoted platform trap of the above described character wherein the said platform holding magnetic means is designed in a novel manner to facilitate the easy and convenient balancing of the magnetic attraction between a single magnet element and the two adjacent ends of the platforms.

Other objects and advantages of the invention will become apparent as the description of the same proceeds and the invention will be best understood from a consideration of the following detailed description taken in connection with the accompanying drawing forming a part of the specification, with the understanding, however, that the invention is not to be limited to the exact details of construction shown and described since obvious modifications will occur to a person skilled in the art.

Figure 1:
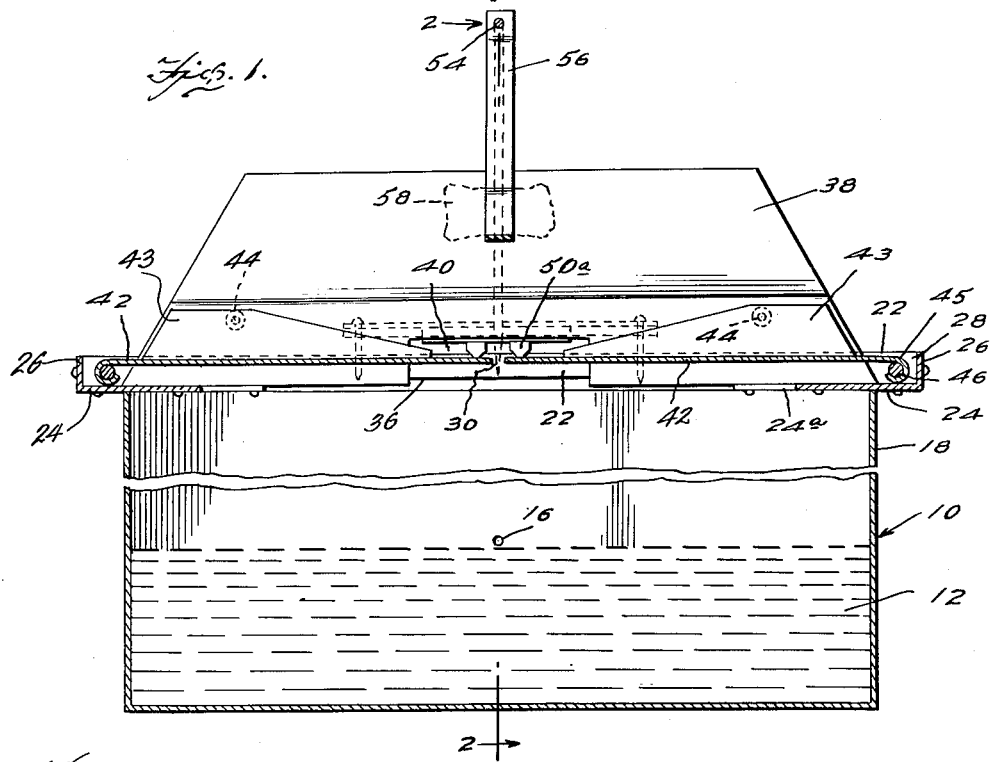
Figure 1 is a central longitudinal section taken, in a vertical plane, through a trap constructed in accordance with the present invention, and looking toward the side upon which the magnetic means is located.

Referring now more particularly to the drawing the numeral 10 generally designates a rectangular receptacle designed to be filled to a predetermined level by a suitable liquid 12 into which the trapped animals are dropped and where they will be speedily destroyed.

In one of the walls of the receptacle, here shown as one of the side walls 14, there is provided an overflow opening 16 whereby, as the liquid level rises due to the dropping of animals into the receptacle, it will be kept at a level which will prevent the downwardly swinging inner ends of the hereinafter described pivoted platforms, from dipping into the liquid.

The side walls 14 of the receptacle extend upwardly so that their top edges 14a are at a slightly higher elevation than the top edges of the end walls 18, for the purpose about to be described.

The numeral 20 generally designates the top or platform floor which overlies the open top of the receptacle. This platform floor comprises the two spaced parallel sections 22 which may be made of wood or the like, which are connected at and across their ends by the underlying flat connecting plate 24. Each of these transverse connecting plates 24 has an upturned outer edge or flange 26 which extends across the adjacent ends of the sections 22, to which it is secured and while the inner end edges of the connecting plates 24 may extend straight across between the side sections 22, they are here shown as having a cut back or recess 24a which is of a width equal to the distance between the inner edges of the sections 22.

Figure 2:
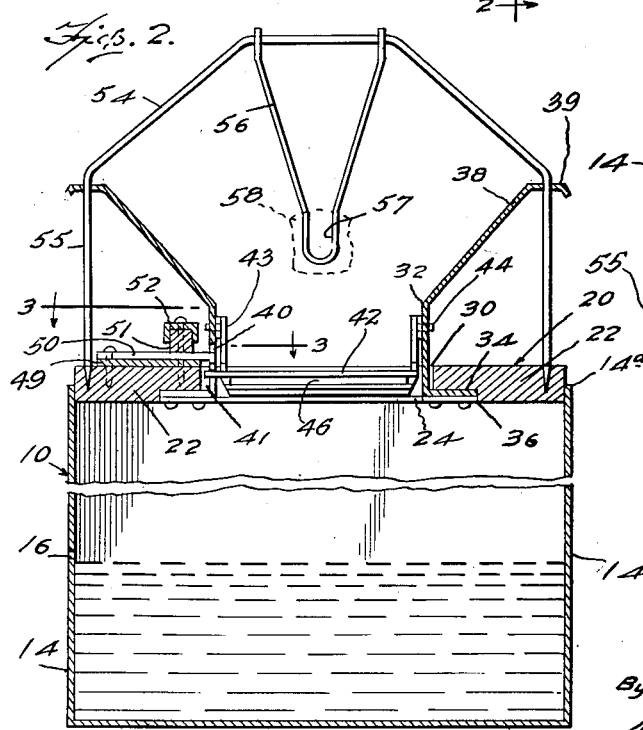
Figure 2 is a vertical transverse section taken substantially on the line 2—2 of Figure 1.

As shown most clearly in Figure 2 the sections 22 are of materially greater thickness than the plates 24 so that there is thus provided at each end of the floor the upwardly opening recess 28 and between the inner end edges of the plates 24 there is provided in association with the inner edges of the side sections 22, the drop opening 30.

Extending along the inner edge of each floor section 22 and spaced slightly therefrom as shown in Figure 2 is the low upstanding wall 32. The lower edge of each of these walls has a laterally turned flange 34 which, together with the adjacent edge of the cross plate 24 is located in a rabbet 36 which is formed in the underside of the sections 22 as shown in Figure 2.

Each wall 32 extends upwardly and laterally as indicated at 38 and terminates in the out turned flange 39.

One of the walls 32 has cut therein the rectangular opening 40 and the inner edge of the platform section 22 has a shallow recess or offset 41 formed therein along the length of the wall opening 40.

Lying horizontally in the space between the walls 32 are two platforms 42, each of which has the longitudinal upstanding side edge wings 43 which are positioned adjacent to the inner sides of the walls 32 as shown in Figure 2.

The wings 43 of each platform are pivotally coupled to the adjacent walls 32 by the laterally extending pivot trunnions 44 which are aligned transversely of the platform in a vertical plane set a substantial distance outwardly from the transverse center of the platform or nearest to the outer end thereof. Thus as will be seen upon reference to Figure 1, the greatest length of each platform is between the pivots 44 and the inner end thereof.

As is also shown in Figure 1 the suspension means for the platforms is such that the top surface of each platform will be either in the same plane as or slightly below the top surfaces of the floor sections 22.

The outer end of each platform has extended thereacross and secured thereto a weight member 45. Such weight member may be attached to the platform in any suitable manner but the platform is here illustrated as having the outer edge rolled into a partial cylinder or sleeve 46 in which the weight, in the form of a short round bar, is housed. Also as will be readily seen the weighted outer end of each platform lies within the adjacent floor recess 28.

As shown the platforms 42 when in their normal set position are horizontal and in the same plane and their inner end edges are in closely spaced relation.

Figure 3:
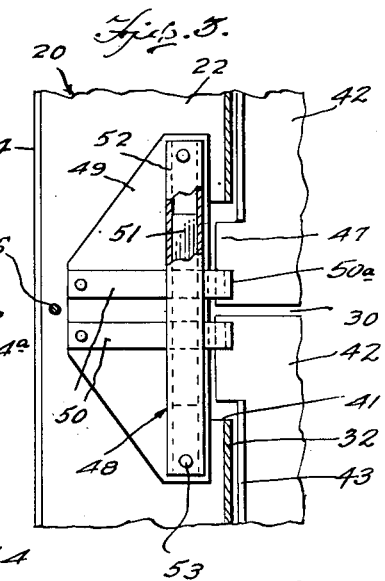
Figure 3 is a fragmentary section taken substantially on the line 3—3 of Figure 2.

The inner end of each platform 42 on the side thereof adjacent to the offset or recess 41, has a portion continued or extended laterally to form an ear 47 which projects into the offset or recess 41 as shown in Figure 3. The platforms are of a suitable magnetic metal for the purpose hereinafter described, this being the preferred construction although it will be readily apparent from the hereinafter set forth description that only the ears have to be of such metal and accordingly it will be understood that the ears 47 may be made as a separate part of the platform if found desirable. However, the one piece construction herein disclosed is preferred.

The numeral 48 generally designates the magnetic platform holding unit. This unit 48 comprises a metal base plate 49 which is secured along the outer side of the recess or offset 41 to the adjacent platform section 22.

Secured across the plate 49 are two magnetic conductor strips 50 which are in spaced parallel relation and which have their inner ends extended downwardly in the form of pointed fingers 50a. Each of these fingers has its downwardly directed pointed end positioned for contact with the top of one platform ear 47 when the platform is in its normal horizontal position.

Disposed across and resting upon the conductor strips 50 is a bar magnet 51. This magnet is maintained adjustably in position upon the conductor strips by the downwardly opening channeled holder 52 in which the bar magnet fits, as shown in Figure 2. This holder 52 is of materially greater length than the bar magnet 51 and is secured in position by the pins or screws 53 which pass through suitable openings in the ends of the holder, through the plate 49 and into the floor section 22 lying thereunder.

It will be readily understood from the foregoing that the magnetic action of the bar magnet 51 passes through the conductor strips to the underlying ears 47 and thus the ears are held in magnetic engagement or attracted to the downturned fingers 50a so that the platforms will be held releasably against free swinging movement. By the employment of a magnet of proper strength the platforms can be held in place for a sufficient length of time before swinging on their pivots to permit an animal such as a mouse or the like to pass a substantial distance beyond the pivots 44 before the weight of the animal overcomes the magnetic attraction to cause the platform to swing downwardly and deposit the animal into the receptacle beneath.

It will also be apparent that by reason of the novel mounting of the magnet 51 the same may be shifted lengthwise for proper adjustment with respect to the conductor strips 50.

In order to facilitate the holding of a bait over the center of the trap at the inner ends of the platforms and between the side walls, there is provided an inverted substantially U-shaped arch 54 having downwardly directed side legs 55 which are passed through suitable openings in the flanges 39 of the side walls and have their lower ends fixed in the platform sections 22 as shown in Figure 2.

Suspended from the top of the arch at the center thereof, is a hanging bait frame 56 which is of U form and has its side portions in relatively closely spaced relation at the bottom of the frame providing the loop 57 in which may be secured by friction a suitable bait material which is shown in dotted outline and designated 58.

From the foregoing it will be evident that there is provided by the present invention, a novel trap structure wherein the pivoted platforms are held in set position in a relatively simple but efficient manner as a result of which the trap will function efficiently, as will be readily apparent.

I claim:

1. An animal trap comprising an open top receptacle designed to contain a liquid, a platform floor overlying the top thereof and having a central opening, a pair of platforms lying in end to end aligned relation in said opening, pivot means supporting each platform for vertical oscillation on a transverse axis lying outwardly of the transverse center of each platform, weight means carried by the remote outer ends of the platforms for urging oscillation of the same to a horizontal position, a pair of magnetic conductor strips positioned adjacent inner ends of the platforms, each conductor strip being positioned to limit the upward movement of the adjacent platform, a metal element carried by each platform and engaged by a conductor strip, and a bar magnet lying across and in magnetic contact with said conductor strips.

2. The invention according to claim 1, with means securing the bar magnet for lengthwise adjustment across the conductor strips.

3. An animal trap comprising an open top receptacle designed to contain a liquid, a platform floor overlying the top thereof and having a central opening, a pair of platforms lying in end to end aligned relation in said opening; pivot means supporting each platform for vertical oscillation on a transverse axis lying outwardly of the transverse center of each platform, weight means carried by the remote outer ends of the platforms for urging oscillation of the same to a horizontal position, magnetic metal ear portions carried by each platform at its inner end and projecting laterally therefrom, a pair of magnetic conductor strips supported on the floor adjacent to said ear portions and each having an inner downturned end opposing the top of the adjacent ear and contacted thereby, and a bar magnet lying upon said conductor strips.

4. The invention as set forth in claim 3, with means for adjustably securing the magnet comprising an elongate channel member lying over and lengthwise of the magnet with the magnet positioned in the channel thereof, and means securing the channel member adjacent its ends to the underlying floor.

References Cited in the file of this patent

UNITED STATES PATENTS

| | | |
|---|---|---|
| 1,515,590 | Calbeck | Nov. 18, 1924 |
| 1,597,551 | Stewart | Aug. 24, 1926 |
| 2,203,580 | Ronning | June 4, 1940 |

FOREIGN PATENTS

| | | |
|---|---|---|
| 502,478 | Great Britain | 1939 |